United States Patent [19]
Susko et al.

[11] Patent Number: 5,671,948
[45] Date of Patent: Sep. 30, 1997

[54] SEAT AND SEAT BELT RESTRAINT ASSEMBLY

[75] Inventors: Thomas J. Susko, Eastpointe; Paul M. St. Clair, Farmington Hills; Todd Hoover, Dearborn, all of Mich.

[73] Assignee: Lear Corporation, Southfield, Mich.

[21] Appl. No.: 630,380

[22] Filed: Apr. 10, 1996

[51] Int. Cl.$^6$ .............................. B60R 22/22; B60N 2/02
[52] U.S. Cl. .................. 280/801.1; 296/68.1; 297/14; 297/335
[58] Field of Search ...................... 280/801.1, 805; 297/14, 335, 336; 296/65.1, 68.1

[56] References Cited

U.S. PATENT DOCUMENTS

| | | |
|---|---|---|
| 2,280,694 | 4/1942 | Embree et al. . |
| 2,855,215 | 10/1958 | Sheren . |
| 2,932,871 | 4/1960 | Phillips et al. . |
| 3,080,634 | 3/1963 | Lindblad . |
| 3,127,652 | 4/1964 | Springer . |
| 3,147,995 | 9/1964 | Bohlin . |
| 3,186,760 | 6/1965 | Lohr et al. ............... 297/470 |
| 3,298,739 | 1/1967 | Scruggs . |
| 3,328,081 | 6/1967 | Scruggs . |
| 3,451,719 | 6/1969 | Lorean . |
| 3,618,975 | 11/1971 | Bombach . |
| 3,758,158 | 9/1973 | Radke et al. . |
| 3,820,815 | 6/1974 | Noir . |
| 3,890,002 | 6/1975 | Warmaskessel ............... 297/471 |
| 4,103,933 | 8/1978 | Fisher et al. . |
| 4,109,962 | 8/1978 | Magyar . |
| 4,222,609 | 9/1980 | Andersson . |
| 4,225,185 | 9/1980 | Krzok . |
| 4,257,626 | 3/1981 | Adomeit ............... 297/470 |
| 4,575,118 | 3/1986 | Matsui et al. . |
| 4,695,094 | 9/1987 | Siebler ............... 297/336 |
| 4,770,459 | 9/1988 | Nakaiwa et al. ............... 297/336 |
| 5,048,866 | 9/1991 | Hirasawa . |

*Primary Examiner*—Paul N. Dickson
*Attorney, Agent, or Firm*—Howard & Howard

[57] ABSTRACT

A bench seat has a backrest cushion and a seat cushion, and can convert between a normal use position and a non-use position where the seat cushion is folded flat against the backrest cushion. The bench seat can also be removed completely from the passenger compartment of the vehicle. The seat cushion includes a tubular frame member. A seat belt buckle includes a strap which connects to a seat bracket welded to the frame member of the seat cushion. A shank extends from the seat bracket and includes a T-shaped male coupling end. A floor bracket is attached to the vehicle floor and has a female coupling which interlocks with the male coupling when the bench seat is in the use position for establishing a secondary path of restraint directly between the seat belt buckle and the floor to transfer restraint loads directly to the floor in the event the frame member of the bench seat yields under restraint loads imposed during sudden deceleration. This arrangement permits the structural members of the bench seat to be constructed of more easily deflectable materials which are lighter in weight and less costly.

13 Claims, 3 Drawing Sheets

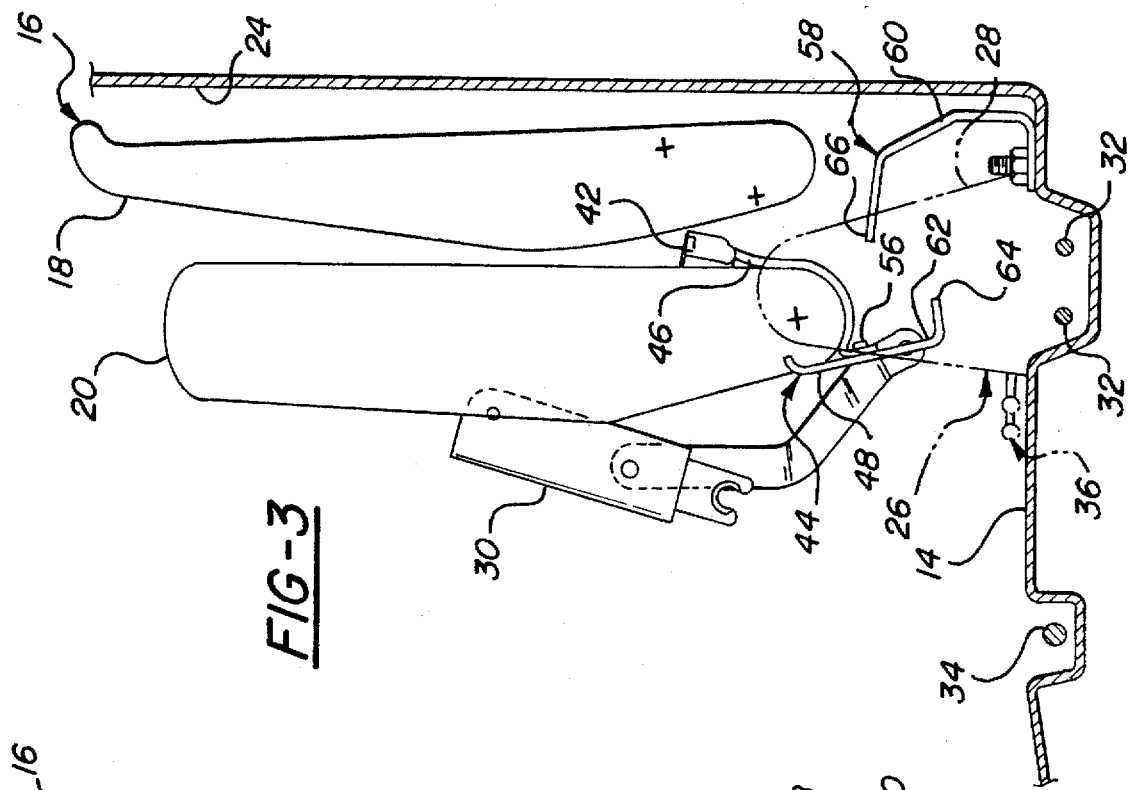
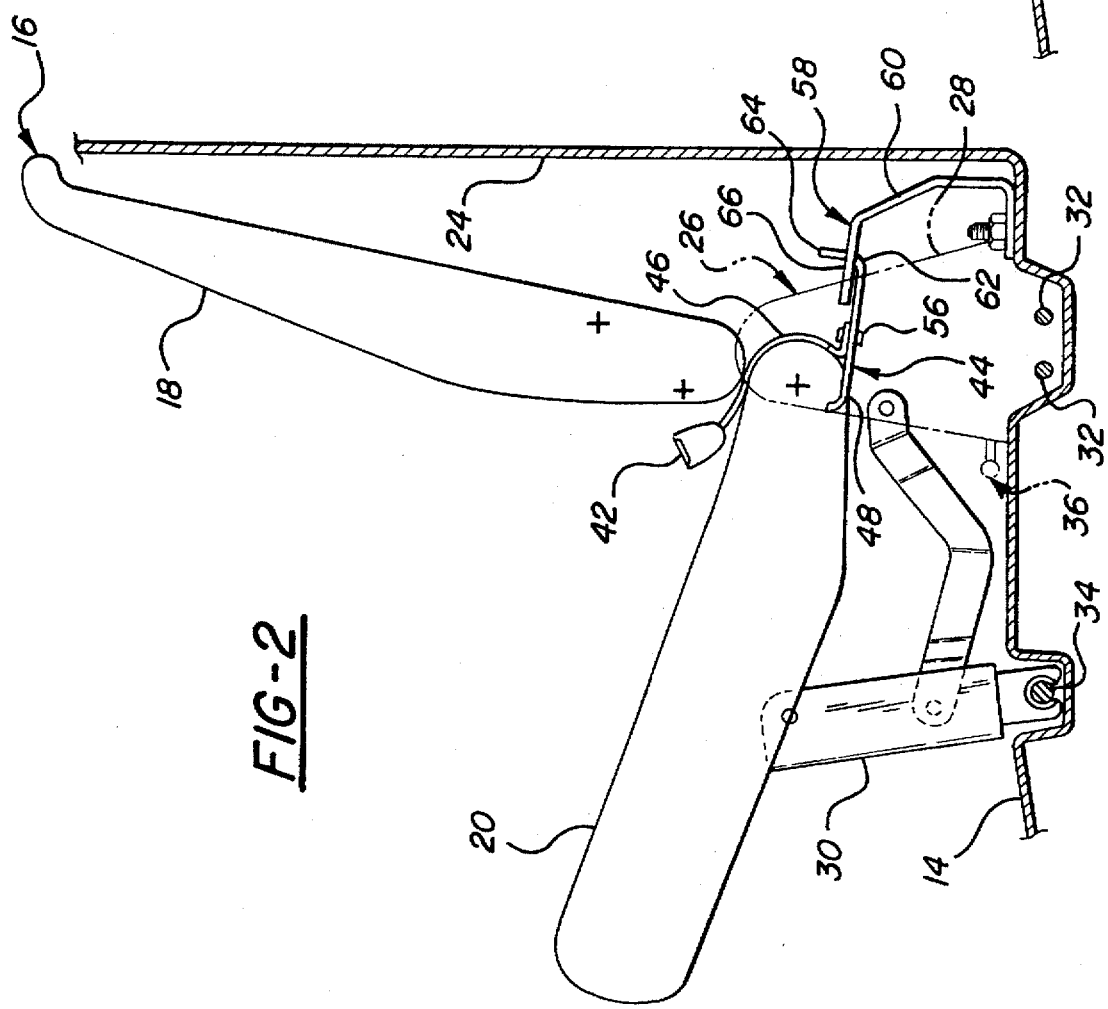

SEAT AND SEAT BELT RESTRAINT ASSEMBLY

TECHNICAL FIELD

The subject invention relates generally to combined bench seat and seat belt restraint assemblies, and more particularly to an improved seat belt anchor arrangement therefor.

BACKGROUND OF THE INVENTION

Many motor vehicles are provided with bench-type seat assemblies in the passenger compartment. If the bench seat is not intended for use by the driver of the vehicle, it may be designed to fold or collapse to a non-use position for increased cargo carrying capacity. Often, such bench seats can also be removed completely from the passenger compartment of the vehicle to provide even greater cargo space.

A seat belt restraint assembly must be provided in connection with the bench seat to safely restrain an occupant in the seat during sudden deceleration of the vehicle. Preferably, the seat belt assembly includes a lap or lap and shoulder strap for each occupant having a clasp-type element attached at the free end. A complimentary seat belt buckle interlocks with the clasp. Usually, the lap or lap and shoulder belts are mounted adjacent the sides of the vehicle body within the passenger compartment for convenient stowage when the bench seat is folded to a non-use position, and likewise when the bench seat is completely removed from the vehicle. However, the seat belt buckle must be positioned away from either end of the bench seat, between its backrest and seat cushions. This is also the case for the lap belt used by the middle seat occupant. It is the buckles and middle lap belt which create engineering design issue over how to securely anchor them while keeping material and fabrication costs to a minimum and allowing convenient removal and re-installation of the bench seat from the passenger compartment.

The prior art advances two options in which to anchor the seat belt buckle portion or the lap belt for the middle seat occupant: to the frame of the seat assembly, or directly to the floor in the passenger compartment. Each prior art option has significant advantages and disadvantages. For example, anchoring the seat belt buckles and middle lap belt to the frame of the bench seat assembly allows the buckles and middle lap belt to be removed with the seat assembly as a unit from the passenger compartment. However, this option requires the structural members of the seat assembly to be constructed of very stiff and strong materials to resist deformation under the heavy loads imposed during sudden deceleration of the vehicle. Alternatively, anchoring the buckles and middle lap belt directly to the floor in the passenger compartment allows the structural members of the seat assembly to be constructed of lighter weight and less costly materials since the heavy loads imposed during sudden deceleration of the vehicle are transferred directly to the vehicle floor. This prior art option, however, is cumbersome for the consumer when he or she desires to remove or install the bench seat assembly because the buckles and middle lap belt must be manually detached from and re-attached to the floor each time.

SUMMARY OF THE INVENTION AND ADVANTAGES

The subject invention comprises a seat and seat belt restraint assembly of the type disposed in a motor vehicle. The assembly comprises a bench seat having a backrest cushion and a seat cushion. A stanchion supports the bench seat above the floor in the vehicle. A seat belt element restrains an occupant in the bench seat during sudden deceleration of the vehicle. A primary anchor is provided for connecting the seat belt element to the bench seat. The improvement of the subject invention comprises a supplemental anchor for establishing a secondary path of restraint directly between the seat belt element and the vehicular floor, independently of the primary anchor, for transferring restraint loads directly to the vehicular floor in the event the bench seat yields under restraint loads imposed during sudden deceleration thereby permitting the bench seat to be constructed of more easily deflectable materials which are lighter in weight and less costly.

The supplemental anchor permits the structural members of the bench seat assembly to be constructed of lighter weight and less costly materials. The supplemental anchor is independent of the primary anchor to the extent that it does not engage or establish a secondary path of restraint until, during a sudden deceleration, the restraint loads exceed the load carrying capacity of the bench seat assembly causing it to yield. When this occurs, the supplemental anchor engages to relieve the bench seat assembly of the restraint loads imposed by the mass of the occupant. Accordingly, the supplemental anchor combines the advantages of the two alternative prior art anchoring techniques, while eliminating the disadvantages associated with both.

It is conservatively estimated that the supplemental anchor of the subject invention can reduce by ten (10) pounds the weight of a typical prior art bench seat assembly having structural members constructed of very stiff and strong materials to resist deformation under the heavy loads imposed during sudden deceleration of the vehicle. This reduction in weight makes removal and installation of the bench seat assembly by the consumer much more convenient, and also helps improve gasoline mileage. Furthermore, cost savings are realized in that the bench seat assembly can be constructed of lighter weight and less costly materials.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is an end view of a bench seat and seat belt restraint assembly according to the subject invention in a normal use position;

FIG. 3 is bench seat and seat belt restraint assembly as in FIG. 2 shown folded to a non-use position;

DETAILED DESCRIPTION OF THE PREFERRED EMBODIMENT

Figure 1:
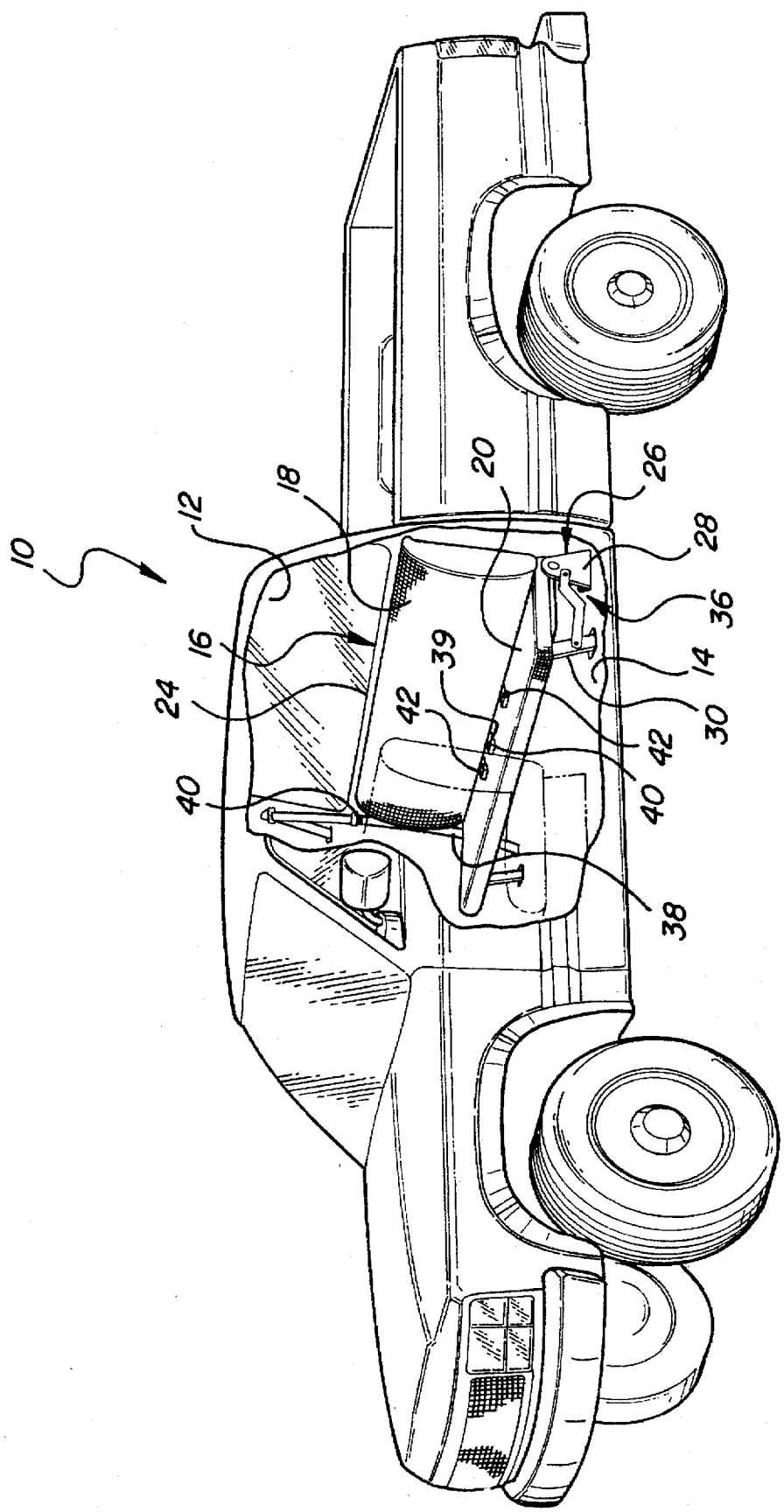
FIG. 1 is a perspective view of a motor vehicle partially cut-away to show a bench seat assembly according to the subject invention.

Referring to the Figures, wherein like numerals indicate like or corresponding parts throughout the several views, a motor vehicle is generally shown at 10 in FIG. 1. The motor vehicle 10 can be of any know type having a passenger compartment 12 with a floor 14. In the preferred embodiment, the vehicle 10 is an extended cab type pick-up truck. Mounted above the floor 14 is a bench seat assembly, generally indicated at 16. Preferably, the bench seat assembly 16 comprises a rear passenger seat. Those skilled in the art, however, will appreciate that other vehicle types and seat types and seating locations are within the scope of the invention.

Referring to FIGS. 2 and 3, the bench seat assembly 16 comprises a backrest cushion 18 and a seat cushion 20 disposed in the passenger compartment 12. The backrest cushion 18 and seat cushion 20 are of the usual construction including an inner frame and spring suspension assembly (not shown) covered with foam and fabric. The bench seat assembly 16 includes a collapsing mechanism, generally indicated at 22, for converting between a use position (FIG. 2) where the seat cushion 20 is generally perpendicular to the backrest cushion 18, and a non-use position (FIG. 3) where the seat cushion 20 is folded generally parallel to the backrest cushion 18. The non-use position could be the situation where the backrest cushion 18 is folded down horizontally over the seat cushion 20, so that cargo can be placed over top of the backrest. Preferably, however, the non-use position is that in which, as shown in FIG. 3, the seat cushion 20 folds up to a vertical position adjacent the backrest cushion 18 to increase floor 14 space to receive cargo and the like. In the case of an extended cab pick-up truck, the seat cushion 20 together with the backrest cushion 18 fold tightly against the back wall 24 of the cab so as to maximize floor 14 space behind the front seats in the vehicle 10. The collapsing mechanism 22 can be of any known type permitting selective movement of one or both of the backrest 18 and seat 20 cushions.

A stanchion, generally indicated at 26 in FIGS. 2 and 3, is associated with the bench seat assembly 16 for supporting the bench seat assembly 16 above the floor 14. The stanchion 26 includes a main rear leg 28 and a retractable front leg 30 on each of the left and right ends of the bench seat assembly 16. Each rear leg 28 attaches to the floor 14 by clasping two recessed (so-called) dog bones 32. The front legs 30 are each pivotally connected to the seat cushion 20 and linked to the respective rear legs 28 to draw inwardly against the underside of the seat cushion 20 as it is moved to the non-use position shown in FIG. 3. The front legs 30 each straddle a respective dog bone 34 recessed in the floor 14.

The stanchion 26 further includes a decoupler, generally indicated at 36 in FIGS. 2 and 3, for disconnecting the bench seat assembly 16 from the floor 14. The decoupler 36 is manually operated to permit complete removal of the bench seat assembly 16 from the vehicle 10 in instances where the maximum available floor 14 space is needed behind the front seats in the passenger compartment 12. In FIG. 3, the decoupler 36 is shown in phantom moved to an unlocked condition in which the rear legs 28 are released from their respective dog bones 32 so that the bench seat assembly 16 can be removed as a unit from the passenger compartment 12. The stanchion 26 and decoupler 36 thus described are of the type and construction known to those skilled in the art.

A seat belt assembly is provided in the passenger compartment 12 to restrain an occupant in the bench seat assembly 16 during sudden deceleration of the vehicle 10. Preferably, the seat belt assembly includes two or more lap or lap and shoulder belts 38 having a clasp-type element 40 attached at the free end. The lap or lap and shoulder belts 38 are permanently anchored to the sides of the vehicle body within the passenger compartment 12. In addition, a lap belt 39 is provided for a middle seat occupant. Seat belt buckles 42 are provided for interlocking with an associated clasp 40 of each of the belts 38, 39.

Figure 4:
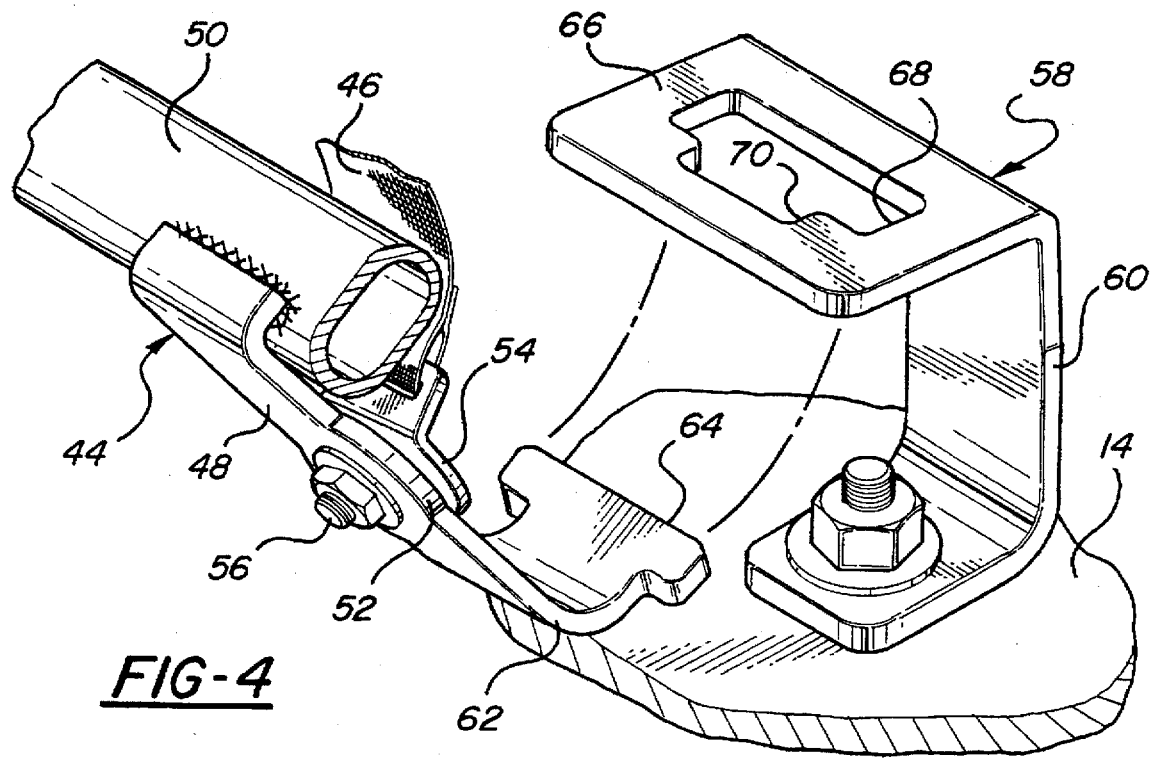
FIG. 4 is a perspective view of the supplemental anchor of the subject invention in the non-use position.
Figure 5:
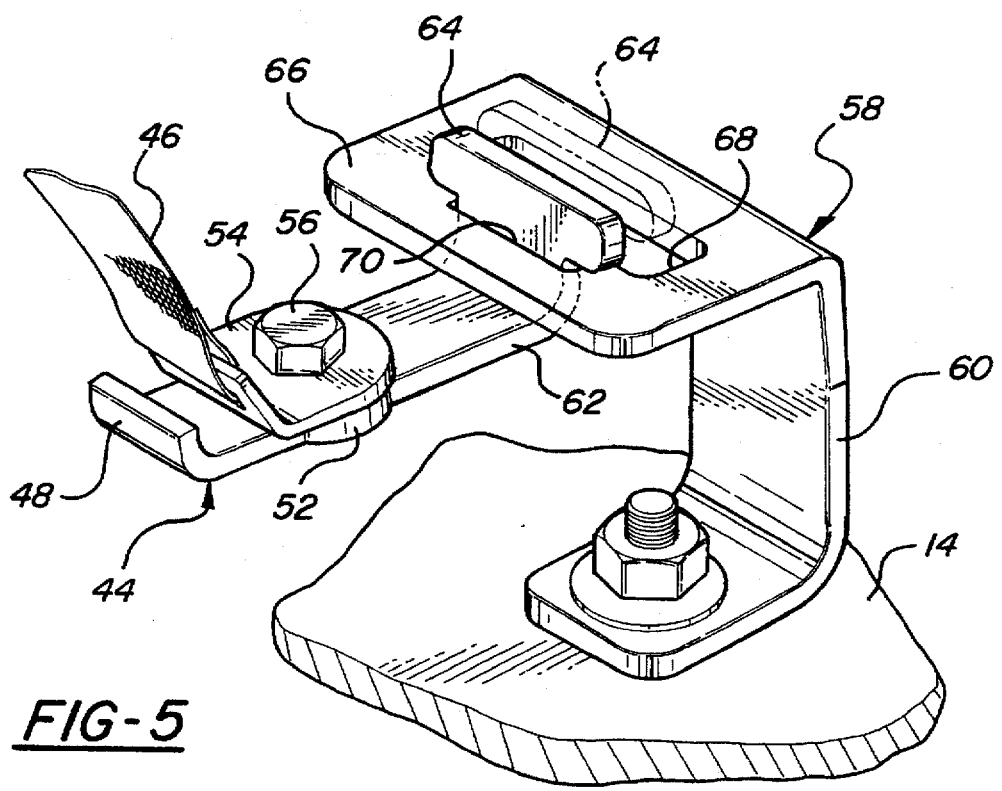
FIG. 5 is a perspective view showing the supplemental anchor in an engaged condition during sudden deceleration of the vehicle, with the normal use position shown in phantom.

A primary anchor, generally indicated at 44 in FIGS. 4 and 5, connects each seat belt buckle 42 as well as the middle lap belt 39 to the bench seat assembly 16. By attaching the buckles 42 and the middle lap belt 39 directly to the bench seat assembly 16, the buckles 42 and the middle lap belt 39 are conveniently removed as a unit together with the bench seat assembly from the passenger compartment 12. The primary anchor 44 includes a strap 46 extending from each buckle 42 between the backrest 18 and seat 20 cushions. Each strap 46 attaches to a respective seat bracket 48, which in turn is welded at a curved inner end to a frame member 50 of the seat cushion 20. Likewise, the middle lap belt 39 also attaches to its own seat bracket 48. The seat bracket 48 includes a belt platform 52 having a centrally disposed hole. The straps 46 are preferably attached to the seat brackets 48 by a mounting plate 54 having a hole aligned with the hole in the platform 52, and a fastener 56 disposed through both the holes, or by any other manner known to those skilled in the art.

In addition to the primary anchor 44, a supplemental anchor, generally indicated at 58 in FIGS. 2-5, is provided for establishing a secondary path of restraint directly between the seat belt element, i.e., the buckle 42 and the middle lap belt 39, and the floor 14 for transferring occupant restraint loads directly to the floor 14 in the event the bench seat assembly 16 yields under the restraint loads imposed during sudden deceleration. The supplemental anchor 58 permits the bench seat assembly 16, e.g., the frame member 50 and the stanchion 26, to be constructed of more easily deflectable materials which are lighter in weight and less costly. The supplemental anchor 58 is independent of the primary anchor 44 to the extent that it does not engage or establish a secondary path of restraint until, during a sudden deceleration, the restraint loads exceed the load carrying capacity of the frame member 50 causing it to yield. When this occurs, the supplemental anchor 58 engages to relieve the frame member 50 and other structural components in the bench seat assembly 16 of the restraint loads imposed by the mass of the occupant.

According to the preferred embodiment of the subject invention, the supplemental anchor 58 includes a detachment mechanism for automatically disengaging the seat belt buckles 42 and the middle lap belt 39 from the floor 14 when the bench seat assembly 16 is moved to the non-use position to facilitate removal of the bench seat assembly 16 and the connected buckles 42 and the middle lap belt 39 from the passenger compartment 12. The detachment mechanism includes a generally C-shaped floor bracket 60 for fixed attachment to the floor 14, and a shank 62 extending integrally from the seat bracket 48. The shank 62 includes a male coupling end 64 and the floor bracket 60 includes a female coupling 66 which interlocks with the male coupling 64 when the bench seat assembly 16 is in the use position and the frame member 50 deflects under loads imposed during sudden deceleration. The male coupling includes a T-shaped head which is curved or bent upwardly from the shank 62. The female coupling 66 includes a T-shaped aperture defined by a receiver slot 68 which is wider than the male coupling 64, and a catch slot 70 which is narrower than the male coupling 64 but slightly wider than the shank 62.

The female coupling 66 is shaped and positioned to permit free ingress and egress of the male coupling end 64 when the seat cushion 20 is moved between the use and non-use positions, as shown in FIG. 4. However, as shown in FIG. 5, when a sudden deceleration of the vehicle 10 causes the frame member 50 to bend under the forces imposed by the forward directed momentum of a restrained occupant, the shank 62 and male coupling end 64 will also move forwardly, causing the male coupling 64 to become locked above the catch slot 70 of the female coupling 66. At this, the frame member 50 and all other structural components in the bench seat assembly 16 will begin transferring the restraint loads imposed by the mass of the occupant to the shank 62 and floor bracket 60. As soon as all bends in the floor bracket 60 have straightened, 100% of the restraint loads passing through the buckle 42 or the middle lap belt 39 will be borne by the supplemental anchor 58.

Of course, those skilled in the art will readily appreciate that in some circumstances it may be desirable to connect the seat bracket 48 to a frame member in the backrest cushion 18 instead of in the seat cushion 20. Also, the floor bracket 60 can be used as an anchor point for a tie-down strap or rope when the bench seat assembly 16 is removed from the passenger compartment 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A bench seat and seat belt restraint assembly of the type disposed in a motor vehicle, said assembly comprising:
a bench seat having a backrest cushion and a seat cushion;
stanchion for supporting said bench seat above a vehicular floor;
a seat belt element for restraining an occupant in said bench seat during sudden deceleration of the vehicle;
primary anchor for connecting said seat belt element to said bench seat;
and a supplemental anchor for establishing a secondary path of restraint directly between said seat belt element and the vehicular floor and for transferring restraint loads directly to the vehicular floor in the event said bench seat yields under restraint loads imposed during sudden deceleration;
said stanchion including a decoupler for disconnecting said bench seat from the vehicular floor;
said bench seat including a collapsing mechanism for converting said bench seat between a use position wherein said seat cushion is generally perpendicular to said backrest cushion and a non-use position wherein said seat cushion is generally parallel to said backrest cushion;
said supplemental anchor including a detachment mechanism for automatically disengaging said seat belt element from the vehicular floor when said bench seat is moved to said non-use position to facilitate removal of said bench seat and said connected seat belt element from the vehicle.

2. An assembly as set forth in claim 1 wherein said detachment mechanism includes a floor bracket for fixed attachment to the vehicle floor, and a shank fixedly attached to one of said seat cushion and said backrest cushion.

3. An assembly as set forth in claim 2 wherein one of said floor bracket and said shank includes a male coupling end and the other of said floor bracket and said shank includes a female coupling interlockable with said male coupling when said bench seat deflects under loads imposed during sudden deceleration.

4. An assembly as set forth in claim 3 wherein said seat cushion includes a frame member, said primary anchor including a seat bracket nonremovably attached to said frame member.

5. An assembly as set forth in claim 4 wherein said shank is fixedly connected to said seat bracket.

6. An assembly as set forth in claim 5 wherein said male coupling includes a T-shaped head extending from said shank and said female coupling includes a T-shaped aperture.

7. An assembly as set forth in claim 6 wherein said floor bracket is generally C-shaped.

8. An assembly as set forth in claim 3 wherein said seat bracket includes a belt platform having a hole disposed therein.

9. An assembly as set forth in claim 8 wherein a strap extends from said seat belt element and a mounting plate is fixedly connected to said strap, said mounting plate having a hole aligned with said hole in said platform, and a fastener disposed through both said holes.

10. A motor vehicle and bench seat assembly combination, said combination comprising:
a motor vehicle having a passenger compartment and a floor in said passenger compartment;
a bench seat having a backrest cushion and a seat cushion disposed in said passenger compartment;
a stanchion for supporting said bench seat above said vehicular floor;
a seat belt buckle for restraining an occupant in said bench seat during sudden deceleration of said vehicle;
a primary anchor for connecting said seat belt buckle to said bench seat;
and characterized by a supplemental anchor for establishing a secondary path of restraint directly between said seat belt buckle and said floor and for transferring restraint loads directly to said vehicular floor in the event said bench seat yields under restraint loads imposed during sudden deceleration;
said stanchion including a a decoupler for disconnecting said bench seat from said floor;
said bench seat including a collapsing mechanism for converting said bench seat between a use position wherein said seat cushion is generally perpendicular to said backrest cushion and a non-use position wherein said seat cushion is generally parallel to said backrest cushion;
said supplemental anchor including a detachment mechanism for automatically disengaging said seat belt buckle from said floor when said bench seat is moved to said non-use position to facilitate removal of said bench seat and said connected seat belt buckle from said passenger compartment of said vehicle.

11. A combination as set forth in claim 10 wherein said detachment mechanism includes a floor bracket fixedly attached to said floor, and a shank fixedly attached to said seat cushion.

12. A combination as set forth in claim 11 wherein one of said floor bracket and said shank includes a male coupling end and the other of said floor bracket and said seat bracket includes a female coupling interlockable with said male coupling when said bench seat deflects under loads imposed during sudden deceleration.

13. A bench seat and seat belt restraint assembly of the type disposed in a motor vehicle, said assembly comprising:

- a bench seat having a backrest cushion and a seat cushion, said seat cushion including a tubular frame member, said bench seat including a collapsing mechanism for converting said bench seat between a use position wherein said seat cushion is generally perpendicular to said backrest cushion and a non-use position wherein said seat cushion is generally parallel to said backrest cushion;
- a stanchion for supporting said bench seat above a vehicular floor, said stanchion including a decoupler for disconnecting said bench seat from the vehicular floor;
- a seat belt element for restraining an occupant in said bench seat during sudden deceleration of the vehicle;
- a seat bracket fixedly attached to said frame member of said seat cushion;
- a strap interconnecting said seat belt element and said seat bracket;
- a shank extending from said seat bracket;
- a floor bracket for fixed attachment to the vehicle floor;
- and characterized by one of said floor bracket and said shank including a male coupling end and the other of said floor bracket and said shank including a female coupling interlockable with said male coupling when said bench seat is in said use position for establishing a secondary path of restraint directly between said seat belt element and the vehicular floor to transfer restraint loads directly to said vehicular floor in the event said bench seat yields under restraint loads imposed during sudden deceleration, said male coupling automatically disengaging from said female coupling when said bench seat is moved to said non-use position.

* * * * *